(12) United States Patent
Matsumoto (10) Patent No.: US 8,004,516 B2
(45) Date of Patent: Aug. 23, 2011

(54) IMAGE PROCESSING SYSTEM FOR VOLUME RENDERING

(75) Inventor: Kazuhiko Matsumoto, Minato-ku (JP)

(73) Assignee: Ziosoft, Inc., Tokyo (JP)

( * ) Notice: Subject to any disclaimer, the term of this patent is extended or adjusted under 35 U.S.C. 154(b) by 293 days.

(21) Appl. No.: 11/216,320

(22) Filed: Aug. 31, 2005

(65) Prior Publication Data
US 2006/0155800 A1      Jul. 13, 2006

(30) Foreign Application Priority Data

Dec. 14, 2004   (JP) .................................. 2004-361281

(51) Int. Cl.
*G06T 15/00* (2011.01)
*G06F 15/16* (2006.01)

(52) U.S. Cl. ......... 345/419; 709/200; 709/203; 709/208
(58) Field of Classification Search .................... 707/10; 345/419, 505; 709/200, 203, 208
See application file for complete search history.

(56) References Cited

U.S. PATENT DOCUMENTS

| | | | |
|---|---|---|---|
| 5,689,708 A * | 11/1997 | Regnier et al. ................. | 709/229 |
| 5,838,906 A * | 11/1998 | Doyle et al. ................... | 715/205 |
| 6,151,688 A * | 11/2000 | Wipfel et al. .................. | 714/48 |
| 6,574,629 B1 | 6/2003 | Cooke et al. ................... | 707/10 |
| 6,681,282 B1 * | 1/2004 | Golden et al. ................. | 710/302 |
| 7,185,007 B2 * | 2/2007 | Yagi ..................................... | 1/1 |
| 7,212,198 B2 * | 5/2007 | Muraki et al. ................. | 345/419 |
| 7,500,038 B2 * | 3/2009 | Smith ........................... | 710/244 |
| 7,562,362 B1 * | 7/2009 | Paquette et al. ............... | 718/102 |
| 7,788,596 B2 * | 8/2010 | Iwabuchi ....................... | 715/800 |
| 2002/0032751 A1 * | 3/2002 | Bharadwaj .................... | 709/218 |
| 2002/0120679 A1 * | 8/2002 | Hayton et al. ................. | 709/203 |
| 2002/0166000 A1 * | 11/2002 | Rossi et al. .................... | 709/328 |
| 2003/0120710 A1 * | 6/2003 | Pulsipher et al. ............. | 709/106 |
| 2003/0154261 A1 * | 8/2003 | Doyle et al. ................... | 709/218 |

(Continued)

FOREIGN PATENT DOCUMENTS

JP        2003-233600        8/2003

(Continued)

OTHER PUBLICATIONS

Ma, K., Painter, J. S., Hansen, C. D., and Krogh, M. F., "Parallel Volume Rendering Using Binary-Swap Compositing", IEEE Computer Graphics and Applications, vol. 14, Issue 4, Jul. 1994, pp. 59-68.*

(Continued)

*Primary Examiner* — Ulka Chauhan
*Assistant Examiner* — Roberta D Prendergast
(74) *Attorney, Agent, or Firm* — Pearne & Gordon LLP (57) ABSTRACT

An image processing system using volume data comprising at least one node connected via a network, which is operative to monitor completion of a task property storing condition for storing a task property of a client terminal, collect the task property of a task state of the client terminal and store the collected task property in a state storing server when the task property storing condition is satisfied, read the task property which corresponds to the client terminal from the state storing server, restore the task state of the client terminal by using the read task property in a proxy node which is at least any one of the node and a node which is newly added to the image processing system, and resume processing to be performed on and after the time when the task property storing condition is satisfied.

12 Claims, 5 Drawing Sheets

U.S. PATENT DOCUMENTS

| | | | |
|---|---|---|---|
| 2003/0229900 A1* | 12/2003 | Reisman | 725/87 |
| 2004/0031058 A1* | 2/2004 | Reisman | 725/112 |
| 2004/0049673 A1* | 3/2004 | Song et al. | 713/150 |
| 2004/0205163 A1* | 10/2004 | Yagi | 709/219 |
| 2005/0015387 A1* | 1/2005 | Sassi et al. | 707/100 |
| 2005/0246340 A1* | 11/2005 | Smith | 707/9 |
| 2005/0256881 A1* | 11/2005 | Harrison et al. | 707/10 |
| 2006/0028479 A1* | 2/2006 | Chun et al. | 345/531 |
| 2006/0155800 A1* | 7/2006 | Matsumoto | 709/200 |
| 2006/0190524 A1* | 8/2006 | Bethke et al. | 709/202 |

FOREIGN PATENT DOCUMENTS

| | | | |
|---|---|---|---|
| JP | 2003233600 A | * | 8/2003 |
| JP | 2004185204 A | | 7/2004 |

OTHER PUBLICATIONS

Ma, K. and Camp, D. M., "High performance visualization of time-varying volume data over a wide-area network status", Proceedings of the 2000 ACM/IEEE Conference on Supercomputing (Cdrom), Dallas, Texas, United States, Nov. 4-10, 2000, IEEE Computer Society, Washington, DC, 10 pages.*

Lichtenbelt, Barthold; Crane, Randy; and Naqvi, Shaz: "Introduction to volume rendering", Hewlett-Packard Professional Books (published in 1998), Chapter 6, pp. 121-138.

Japanese Office action with Concise Statement in English, Jan. 2008.

Matsumoto Kazuhiko "Volume Data application of network image processing" A Monthly Journal of Medical Imaging and Information, vol. 36, No. 6, p. 114-120, May 2004.

* cited by examiner

IMAGE PROCESSING SYSTEM FOR VOLUME RENDERING

This application claims foreign priority based on Japanese Patent application No. 2004-361281, filed Dec. 14, 2004, the contents of which is incorporated herein by reference in its entirety.

BACKGROUND OF THE INVENTION

1. Field of the Invention

The present invention relates to an image processing system and an image processing method for volume rendering, and more particularly to an image processing system and an image processing method for performing a volume rendering image processing or a region segmentation processing, using a plurality of computers connected via a network.

2. Description of the Related Art

With the development of an image processing technique using computer, appearance of CT (Computer Tomography) scanner and MRI (Magnetic Resonance Imaging) that enables an internal structure of the human body to be directly observed has brought about innovation in the medical field. A medical diagnosis using a tomographic image of the living body has been widely performed. In recent years, as a technique for visualizing a three dimensional structure inside the complex human body which is difficult to recognize only with the tomographic image, for example, a processing technique for directly drawing an image of the corresponding three dimensional structure from the three dimensional digital data of the object obtained from CT scanner or other image acquiring system, particularly an image processing called the volume rendering, has widespread, and has been employed for medical diagnosis.

Conventionally, ray casting has been well known as a superior method for volume rendering. Ray casting is a method for forming a transparent image of three dimensional structure inside an object by radiating virtual rays from a virtual starting point to the object, and forming the image of a virtual reflected light which comes from inside the object on a virtual projection plane. A fundamental theory of ray casting is described in "Introduction To Volume Rendering", written by Barthold Lichtenbelt, Randy Crane, and Shaz Naqvi, Hewlett-Packard Professional Books (published in 1998), Chapter 6, pg. 121-138, for example.

Herein, ray casting is briefly described.

A minute unit area forming a constituent unit of the three dimensional area of the object is called a voxel, and the intrinsic data of the voxel representing the characteristic such as a density value is called a voxel value. The entire object is represented by voxel data which is three dimensional array of voxel values. Usually, two dimensional tomographic images obtained by CT scanner or other image acquiring system are layered and interpolated, as required, whereby voxel data of three dimensional array is obtained.

A virtual reflected light from virtual rays radiated from virtual starting point to the object is produced in accordance with opacity, an opacity value, which is artificially set by voxel value. Moreover, in order to shade a virtual surface stereoscopically, a gradient of voxel data, that is a normal vector, is obtained, and a shading factor for shading is calculated from the cosine of the angle between the virtual ray and the normal vector. The virtual reflected light is calculated by multiplying the intensity of virtual rays radiated to the voxel by the opacity of voxel and the shading factor. The virtual reflected light is integrated along virtual rays, and calculated for all the coordinate points on the virtual projection plane, whereby a virtual transparent image of a three dimensional structure is formed. The above calculation is hereinafter referred to as a "volume rendering process".

A volume rendering image obtained as described above is a three dimensional color image drawn by using a number of volume rendering parameters for the subject voxel data.

Volume rendering parameters include display control parameters such as zoom ratio, angle and position, color parameters, opacity parameters, shading parameters, image filter, image fusion method, rendering method, light source, time series and phase parameters, projection method, display area parameters, segmented area parameters and multi image registration parameters. These parameters are referred to as the "additional information" in the following.

In practical medial diagnosis, user of a medical image processing system observes volume rendering image from various points of view by successively updating the settings of the volume rendering parameters for subject voxel data. For example, since adequate opacity value varies according to a diagnosis tissue, the user sets up the opacity value for each voxel data. Also, in order to easily observe a region of interest such as a diseased part, tissues obscuring the region of interest are removed, or tissues are colored appropriately.

It may also be necessary for the user to set parameters by performing various complicate edit operations. The edit operations may be continued until appropriate parameters are set and a volume rendering image which meets a diagnosis purpose is obtained.

Conventionally, the total process of image processing of volume rendering, including storage, calculation and display, is performed by one or more computers. Especially for cases in which a plurality of computers are employed, various innovations are made on distribution of computer resources and parallel processing.

Also, various methods for distributing the total process of image processing of volume rendering over a plurality of computers have been offered (e.g., refer to JP-A-2003-233600).

Hitherto, in a single volume data processing system, user can resume task in the previous state by storing task property in the computer operated by the user when the task was interrupted.

However, when volume data processing is performed by distributed processing of a plurality of computers as described above, task property is stored in the client terminal operated by the user previously, and thus the user needs to use the previously operated terminal to resume the task.

In this case, for example, when the client terminal enters long-term maintenance or the user attempts to resume the task in a different location, inconvenience is caused.

On the other hand, the state of image processing server also changes with the passage of time, and thus it is not easy to resume calculation.

SUMMARY OF THE INVENTION

It is therefore an object of the invention to provide a volume data processing system which enables a client terminal different from the client terminal that interrupted a task to resume the task.

In order to solve the problems described above, in an embodiment of the invention, an image processing system using volume data comprising at least one node connected via a network which includes a client terminal, a state storing server, an image processing server and a data server, the image processing system is operative to monitor satisfaction of a task property storing condition for storing a task property of the client terminal, collect the task property of a task state of the client terminal and store the collected task property in the state storing server when the task property storing condition is satisfied, read the task property which corresponds to the client terminal from the state storing server, restore the task state of the client terminal by using the read task property in a proxy node which is at least any one of the node and a node which is newly added to the image processing system; and resume processing to be performed on and after the time when the task property storing condition is satisfied.

In an embodiment of the invention, the task property includes at least one of a window layout, an image type, an user defined caption, a diagnosis result, a camera position, a camera type, a camera angle, a magnifying scale power of a camera, an operating system level information, an operating system version information, a mask and region extraction information, a path information representing a vessel course and the like, an additional information map provided by an image analysis, a necessary information for generating a same image as an image when the task property of the client terminal is stored, an information of an identifier, a processing capability and the like of the node taking charge of the task, an identifier of image source data being processed, a user name, a processing date and time, an additional information, an information indicating intermediate step of calculation, and a patient information.

In an embodiment of the invention, the proxy node is operative to select at least one image processing server from the node for restoring the task state of the client terminal.

In an embodiment of the invention, the proxy node is operative to inquire of the image processing server whether the image processing server holds an image source data which can be used for restoring the task state of the client terminal so as to select the at least one image processing server.

In an embodiment of the invention, the image processing system is further operative to monitor a calculation resource amount which includes at least anyone of a current load state, a performance record, a status specification and a distance on the network of the at least one node respectively.

In an embodiment of the invention, the image processing server is capable of assigning the processing of the image processing server to at least one other image processing server.

In an embodiment of the invention, at least any one of volume rendering processing, region extraction (segmentation) processing, image filtering processing, noise removal processing, image fusion processing, perfusion calculation processing, back projection processing, projection processing and geometry transform processing is performed.

In an embodiment of the invention, the task property storing condition includes at least any one of non-existence of command for a certain amount of time, every expiration of a certain amount of time, when the client terminal enters a specific state, when the state storing server enters a specific state, when an explicit command is received from the client terminal, when the client terminal is paused, and when the user exits task involved in the image source data.

In an embodiment of the invention, the client terminal comprises a plurality of client terminals, and the task property storing condition is further satisfied for the client terminal with low priority when the client terminal with high priority exists in the system and a load on the system is high.

In an embodiment of the invention, at least any one of a termination of the client terminal and a release of the image processing server is performed when the task property storing condition is satisfied.

In an embodiment of the invention, the image processing server acquires an image source data from the data server when the processing is resumed.

DESCRIPTION OF THE PREFERRED EMBODIMENTS

The best mode for carrying out the invention will be discussed in detail with the accompanying drawings.

For example, the invention can deal with the following case:

A doctor A references (or diagnosis) an image of a patient F on an image terminal in a film-viewing room, then suspends the task and shuts down the image terminal to go home. On the next day, when the doctor A references the image of the patient F on an image terminal in a conference room which is not the image terminal operated the day before in the film-viewing room, the doctor A can restore the task state that is of the day before immediately on the image terminal in the conference room and can explain the condition of the disease of the patent F for other doctor while seeing the image.

Figure 1:
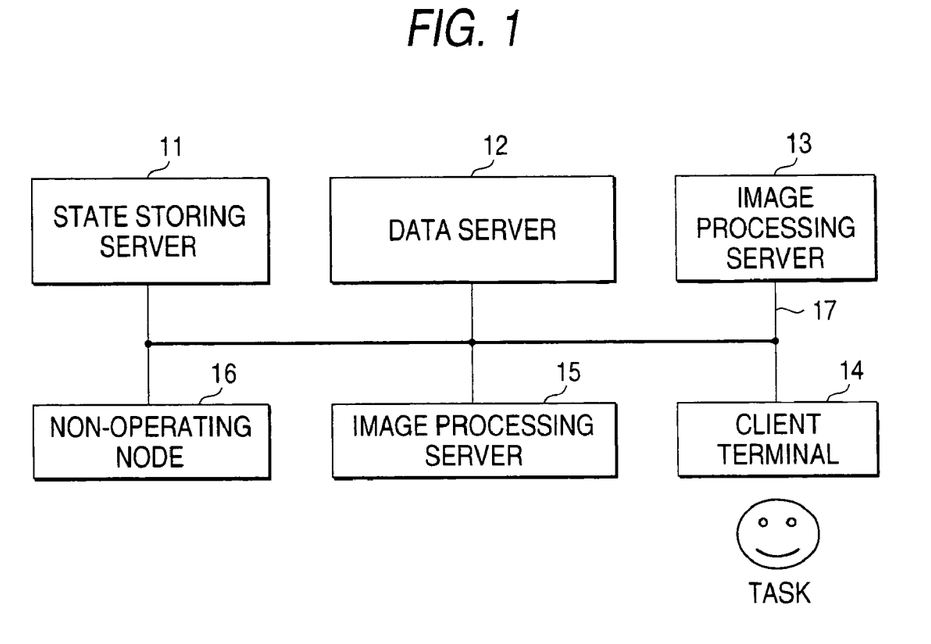
FIG. 1 is a block diagram of a volume rendering image processing system according to the invention.

FIG. 1 is a block diagram of a volume rendering image processing system according to the invention that can deal with the case described above.

As shown in FIG. 1, the image processing system comprises a state storing server 11, a data server 12, an image processing server 13, a client terminal 14, an image processing server 15, and a non-operating node 16.

The state storing server 11 is a server provided by the invention for storing the task state. The data server 12 is a server mainly storing an enormous amount of image source data. The client terminal 14 is a terminal directly operated by the user. The image processing servers 13 and 15 are calculation nodes that perform distributed processing of volume rendering image processing. Each of the above components is a node. The non-operating node 16 is a node which belongs to the system; here, the node is not involved in image processing. The term "node" used here refers to a computer as a calculation unit; a supercomputer incorporating a plurality of CPUs is also one node, a server is also one node, a personal computer is also one node, and a notebook personal computer is also one node.

Each node is connected via a network 17. The connection may be any electronic connection such as an intranet, Internet and phone lines. Moreover, the nodes may be linked by a wired connection or a wireless connection such as a radio wave communication and a laser communication.

The image processing using volume data handled here includes volume rendering processing, region extraction (segmentation) processing, image filtering processing, noise removal processing, image fusion processing, perfusion calculation processing, back projection processing, projection processing, geometry transform processing, etc.

Anode of the image processing system includes: a storing condition satisfaction monitoring section which monitors satisfaction of a condition for storing task property of the client terminal; a task property storing section which collects task property of the task state of the client terminal when the condition is satisfied, and stores the task property in the state storing server; a task property reading section which reads from the state storing server the task property which corresponds to the client terminal of which task property is stored; a task state restoring section which restores the task state using the read task property; and a processing continuing section that continues processing on and after the time when the condition is satisfied.

The state storing server 11 is usually static (fixed), but the roles of the image processing servers 13 and 15 and the client terminal 14 can be easily switched. Furthermore, one node can also have a plurality of functions at the same time. For example, one node can serve as the state storing server 11 and the image processing server 13, or the client terminal 14 and the image processing server 15.

The information to be stored contains information listed in (1) to (16) below as "task property." Task property is information used to restore the image being processed other than "image source data". Image source data is a data derived from medical imaging devices; this contains 2D image, 3D volume data both still or motion. Additionally, image source data contains attached information of patient and scanning condition.

(1) Window layout;
(2) Image type (ray casting, MPR (Multi Planar Reconstruction), MIP (Maximum Intensity Projection));
(3) User defined caption, diagnosis result;
(4) Camera position, camera type, camera angle, magnifying scale power of camera, etc.;
(5) Mask, region extraction information;
(6) Path information representing vessel course, etc.;
(7) Additional information map (for example, Perfusion) provided by image analysis;
(8) Any other necessary information for generating the same image as an image when the task property of the client terminal is stored;
(9) Identifier of image source data being processed;
(10) User name;
(11) Processing date and time.

It is also desirable that the following information be added to the task property:

(12) OS (operating system) level information, version information;
(13) Information of identifier, processing capability, etc., of the node taking charge of the task;
(14) Additional information;
(15) Information indicating intermediate state of calculation;
(16) Patient information (for example, patient name, gender, age, etc.).

Figure 2:
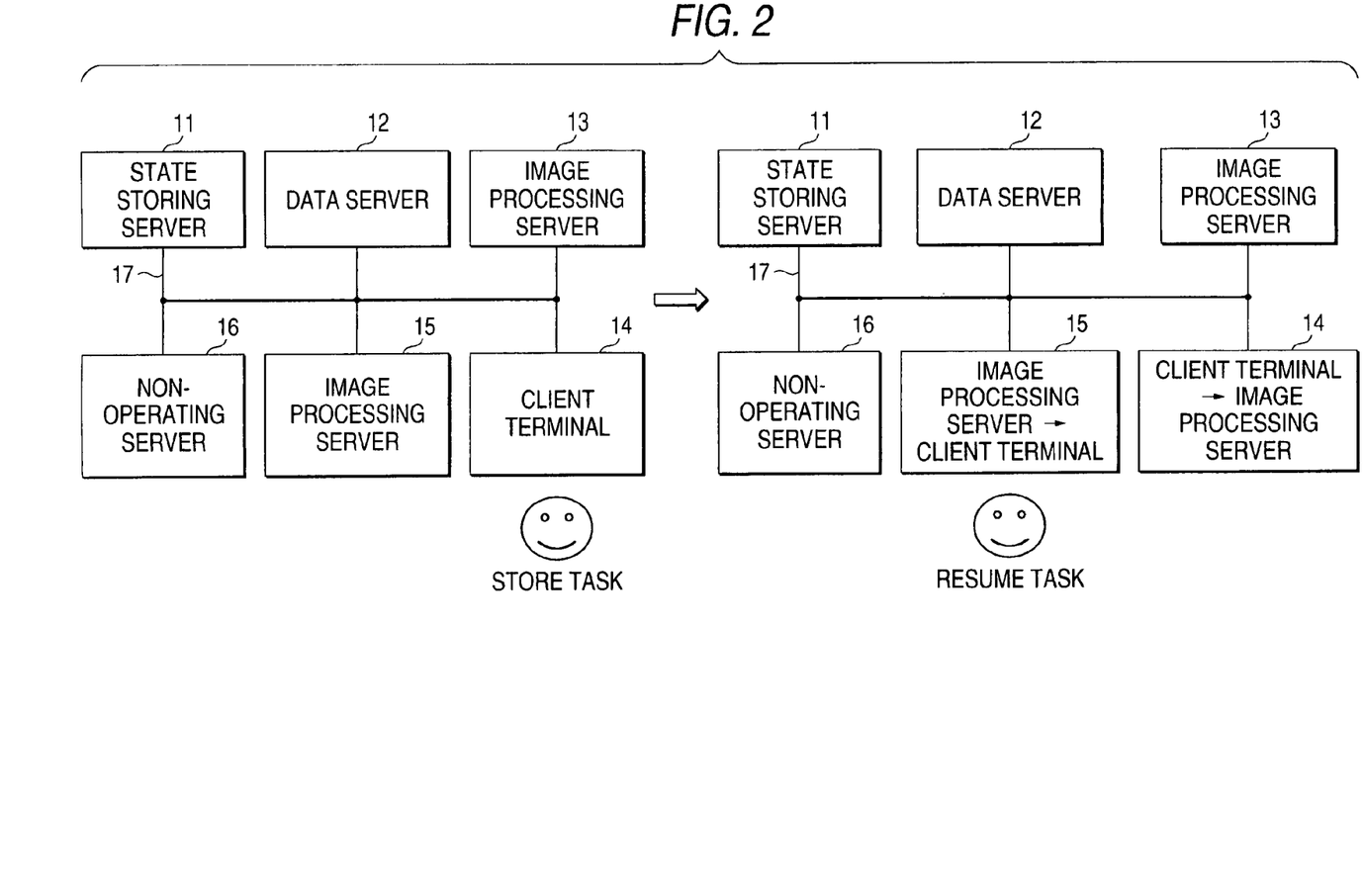
FIG. 2 is a schematic representation for the user to resume the previous task using a different terminal in the volume rendering image processing system shown in FIG. 1.

FIG. 2 is a schematic representation for the user (user) to resume the previous task using a different terminal in the volume rendering image processing system shown in FIG. 1.

In FIG. 2, the left figure shows the case in FIG. 1 performing the previous task, and the right figure shows the case of resuming the task. In the left figure of FIG. 2, the user uses the client terminal 14 and uses the two image processing servers 13 and 15 for performing distributed processing based on the data transmitted from the data server 12 in order to execute any desired volume rendering image processing, and conducts a diagnosis of the patient using the result displayed on a display of the client terminal 14. According to the example of the case described above, this is when the doctor A references the image of the patient F on the image terminal in the film-viewing room.

Next, for some reason, the task is interrupted (in the example of the case described above, the doctor A returns home). In this case, the storing condition satisfaction monitoring section monitors whether the condition for storing the task property of the client terminal is satisfied, and when the condition is satisfied, the storing condition satisfaction monitoring section instructs the task property storing section to collect the task property of the task state of the client terminal and stores the task property in the state storing server 11. Thus, the task property just before the task is interrupted in the image processing servers 13 and 15 is stored in the state storing server 11 provided by the invention. To store the task property, the task property is transferred from the client terminal 14 to the state storing server 11. The task property is the image identifier, the geometry information, the image processing server identifier, the region information, etc., as described above. The image source data itself is not stored in the state storing server. The image processing system differs from a network storage system in this point.

When the task property storing condition is satisfied, the client terminal exits the task and the image processing servers are released.

Although this storing is performed as instructed by the user, some of such task property storing conditions may be preset, so that when any task property storing condition is satisfied, the task property may be stored automatically.

The task property storing conditions are, for example, as follows.

(1) non-existence of command from the user for a certain amount of time. In such case, the probability is high that the user has left from the terminal and will not enter any command for a while. (Therefore the task property should be stored.)
(2) Every expiration of a certain amount of time. As the task property is stored for every certain amount of time, the task history is recorded, enabling the user to return to any desired task state.
(3) When the client terminal 14 enters a specific state. The specific state of the client terminal can be
 (a) expiration of a certain amount of time;
 (b) when the client terminal terminates;
 (c) when the condition specified by the user in advance is met;
 (d) when calculation which takes time completed. This includes process which modifies task property such as region extraction process;
 or the like.
(4) When the state storing server 11 enters a specific state. The specific state of the state storing server can be
 (a) expiration of a certain amount of time;
 (b) when the condition specified by the user in advance is met;
 (c) when the communication with the client terminal is disconnected; or the like.
(5) When an explicit command is received from the client terminal 14.
(6) When the client terminal is paused.

(7) When the user exits task using the image source data, etc.

(8) When a client terminal having high priority exists in the system and the load on the system is high, the task property storing condition of a client terminal having low priority is satisfied.

Next, the case of resuming the task will be discussed with the right figure of FIG. 2.

According to the example of the case described above, this is when the doctor A references (or diagnosis) the image of the patient F on the image terminal in the conference room on the next day. First, the user (doctor A) resumes the task with the desired terminal (image terminal in the conference room). In the figure, the node 15 which previously performed image processing is selected as the client terminal rather than the node 14 which previously served as the client terminal. It is one of the advantages of the invention that an arbitrary node can thus be selected as a client terminal. Thus, the task state can be restored to the former state.

According to the invention, in this case, the user uses the client terminal 15 to transfer the task property from the state storing server 11. Specifically, the task property reading section reads the task property corresponding to the client terminal that stored the task property from the state storing server, and the task state restoring section uses the read task property to restore the task state, and then the processing continuing section continues processing on and after the time when the condition is satisfied.

Here, it is also possible to newly assign the role of the image processing server to the node 14 that was the client terminal previously. According to the invention, thus the role of the image processing server is not static to the node 15 used as the previous image processing server, and can be assigned to any of the nodes. However, it is efficient to re-assign the role of the image processing server to the previous image processing server considering the past record and specification of individual nodes. Particularly, if the previous image processing server (for example, the node 13) holds the image source data, it is advisable to assign image processing priority to the image processing server. To do this, one node is selected as "proxy node." The "proxy node" mentioned here is particularly (1) a single and (2) dynamically determined node, that receives a command from the client terminal at the time when the processing resumes. The "proxy node" may usually be the node which newly becomes a client terminal, but may be any other node. The proxy node includes image processing server selecting section which selects an image processing server, and data hold inquiring section which inquires of each image processing server whether or not the image processing server holds image source data to be processed by the task. As a result, if the image processing server holds data, the image processing server selecting section selects the image processing server holding data.

It is advisable to enable the image processing server which performs processing to assign the processing to any other image processing server when the processing load becomes heavy.

To do this, in the image processing system, at least one node is provided with node calculation resource amount monitoring section which monitors the calculation resource amount comprises one or more of the current load state, the performance record, the status, the performance specification and the distance on the network of each node, and the image processing server is provided with monitored data inquiring section which inquires about monitored calculation resource amount data. Accordingly, the image processing server inquires of the node calculation resource amount monitoring section about monitored calculation resource amount data, and thus the image processing server can select the optimum node as another image processing server, so that the image processing server can assign its processing to at least one additional image processing server.

Figure 3:
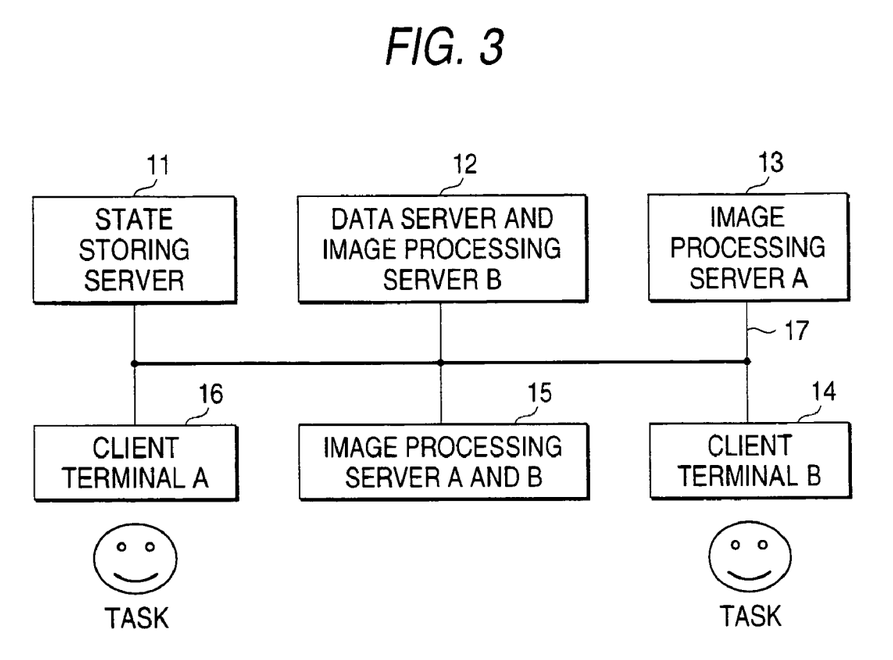
FIG. 3 is a schematic representation when each of two users (doctors) performs any desired volume rendering image processing from a different terminal with respect to one another by making a plurality of image processing servers to perform distributed processing, in the volume rendering image processing system shown in FIG. 1.

FIG. 3 is a schematic representation when each of two users (doctors) performs any desired volume rendering image processing at the same time from a different terminal by making a plurality of image processing servers to perform distributed processing, in the volume rendering image processing system shown in FIG. 1.

In FIG. 3, client terminals A and B are the node 16 which is the non-operating node and the node 14 which is the client terminal in FIG. 1. The role of the image processing server is assigned to the data server 12, which functions both as an image processing server and a data server, as well as to the nodes 13 and 15 which are the image processing servers in FIG. 1. In this case, the image processing server 15 is dedicated to the client terminals A and B, the image processing server 13 is dedicated to the client terminal A, and the data server and image processing server 12 is dedicated to the client terminal B.

Thus, according to the invention, a plurality of client terminals can also exist at the same time, and it is also possible for one node (here, node 12 of data server) to execute different types of processing. The state storing server 11 is also static here, but need not necessarily be static.

Several types of processing concerning the invention will be discussed additionally.

In the embodiment, when an interrupt command is posted, the relevant image processing servers all halt processing. The image source data existing in memory of each image processing server when processing is halted need not be stored in an HDD (rather slow than network image acquiring) of the image processing server. However, if the image processing server is re-selected as an image processing server and the image source data remains in the memory at the time when the processing resumes, the image source data can be used without change. Therefore, to promote reuse of the image source data as much as possible, whether or not the image processing server holds image source data is inquired at the time when the processing resumes, whereby assignment of the image processing servers can be optimized.

Considering limit of memory capacity, the progress state of calculation is not always stored. In case, if the image processing server holding no image source data is selected, data is acquired from the data server again.

It is advisable to enable each node to delay discarding image source data until the memory of the node becomes insufficient. The progress state of calculation is not stored, because the advantage of storing the progress state of calculation is small although efficiency may be improved.

The task property need not be discarded from the user terminal or the image processing server, but need not necessarily be stored in a local hard disk. This is because if the task property does not exist in the local hard disk or the task property in the local hard disk is invalid, the task property stored in the state storing server is used.

Figure 4:
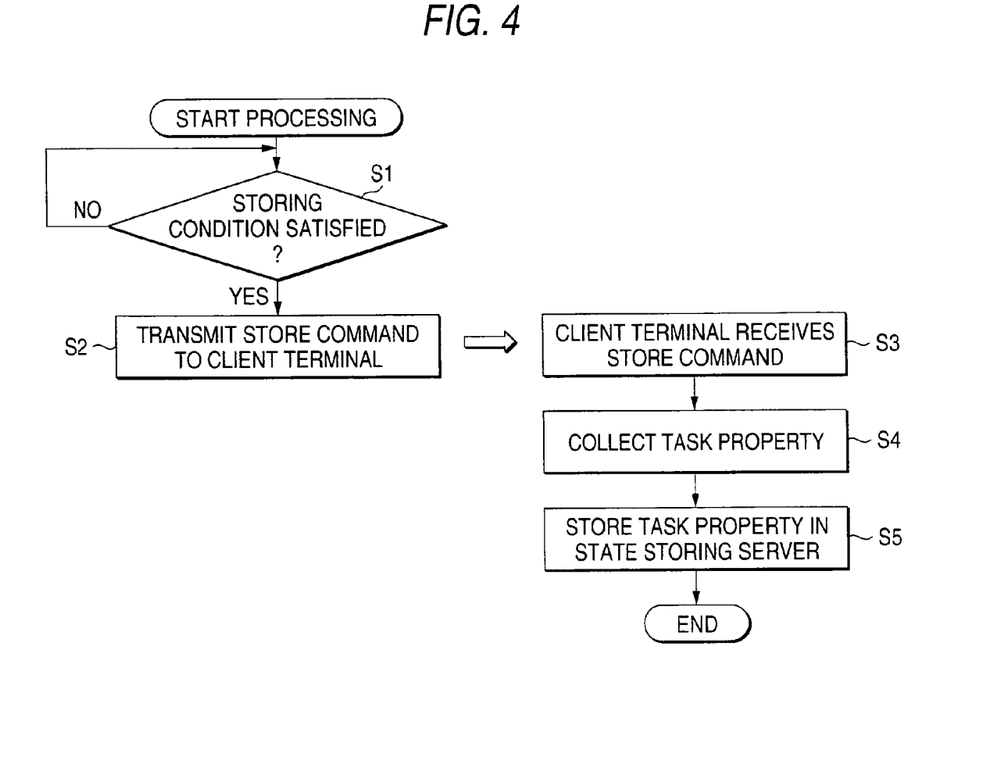
FIG. 4 is a flowchart for storing the task state in the volume rendering image processing system shown in the left drawing of FIG. 2.

FIG. 4 is a flowchart for storing the task state in the volume rendering image processing system shown in the left drawing of FIG. 2.

At step S1, whether or not the storing condition is satisfied is constantly checked. The check may be made by any of the image processing server, the client terminal, or the state storing server. This means that the entire system is checking whether a storing condition is satisfied or not.

The task property storing condition monitored by the storing condition satisfaction monitoring section is (1) non-existence of command for a certain amount of time, (2) when the client terminal enters a specific state, (3) when the state storing server enters a specific state, (4) when an explicit command is received from the client terminal, (5) when the client terminal is halted, (6) when the user exits task involved in the image source data, etc., as described above.

When the storing condition is satisfied, the process goes to step S2 and a store command is transmitted to the client terminal.

On the other hand, if the client terminal receives the store command at step S3, the client terminal collects task property at step S4.

The task property includes window layout, image type, user defined caption, diagnosis result, camera position, camera type, camera angle, magnifying scale power of camera, operating system level information, operating system version information, mask and region extraction information, path information representing vessel course, etc., additional information map provided by image analysis, necessary information for generating a same image as an image when the task property storing condition is satisfied, information of identifier, processing capability, etc., of node taking charge of the task, identifier of image source data being processed, user name, processing date and time, additional information, information indicating progress state of calculation, etc.

When the collection of predetermined task property terminates at step S4, the process goes to step S5 and the client terminal stores the task property in the state storing server and exits the sequence of storing the task.

Figure 5:
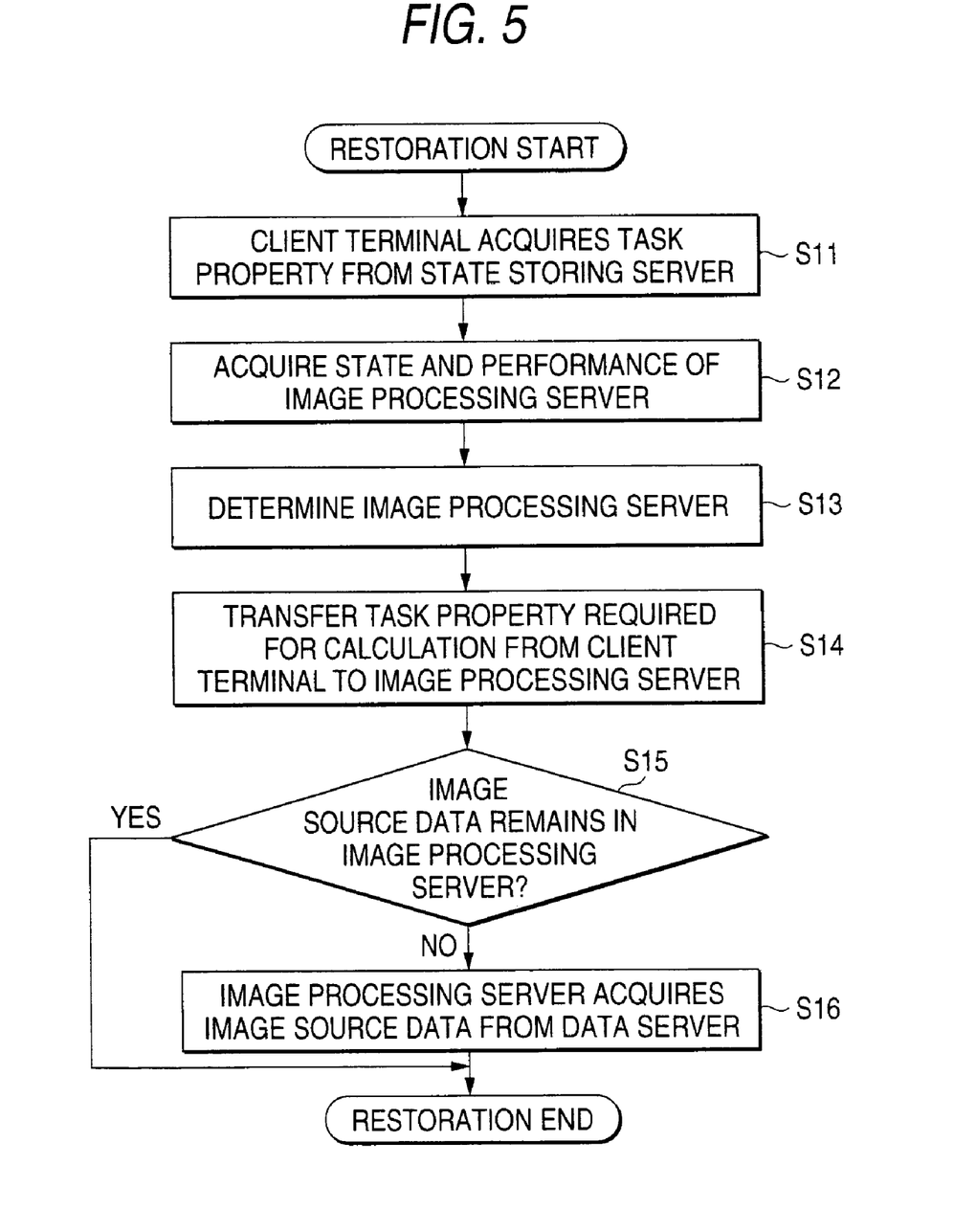
FIG. 5 is a flowchart for resuming (recovering) the task state in the volume rendering image processing system shown in the right figure of FIG. 2.

FIG. 5 is a flowchart for resuming (recovering) the task state in the volume rendering image processing system shown in the right figure of FIG. 2.

When the user enters a restoration start command from the terminal, the client terminal acquires task property from the state storing server at step S11.

When acquiring the task property from the state storing server terminates at step S11, the client terminal goes to step S12 and acquires the state and the performance of every candidate node to be assigned as the image processing server among the nodes in the system.

After acquiring the state and performance of every candidate node for image processing server at step S12, the client terminal goes to step S13 and determines which node or nodes are assigned as the image processing server or servers, and which processing is assigned to each server.

At step S14, the task property required for calculation is transferred from the client terminal to the determined image processing server.

At step S15, whether or not image source data for the restoration remains in the image processing server is checked. If the image source data does remain, the restoration task is ended. If the image source data does not remain, the process goes to step S16.

At step S16, the image processing server acquires the image source data remaining in the data server, the acquired image source data is used for the restoration, and the restoration task is terminated.

In the example of the case described above, according to the invention, the state storing server is provided, whereby after the doctor A references (or diagnosis) the image of the patient F on the image terminal in the film-viewing room, interrupts the task to go home and thus the task state is stored according to the procedure in FIG. 4 in the state storing server. The state storing server can be accessed from each node, so that on the next day, if the doctor A references the image of the patient F on an image terminal in the conference room rather than the image terminal operated the day before in the film-viewing room, the doctor A can use the image terminal in the conference room to call up the task state that is of the day before from the state storing server according to the procedure in FIG. 5.

Without the state storing server according to the invention, information that requires time to be generated, such as region information and diagnosis comment (user defined caption), must again be prepared each time the image is opened; it is very cumbersome. The state storing server according to the invention can save the doctor (user) from having to perform such operation.

In an existing standalone system not considering a network, the above-mentioned information is stored on a local hard disk. However, in a network image processing system, the user may change the terminal before the task is completed. Thus it is necessary that the above-mentioned information is stored in the state storing server, whereby it is made possible to handle the above-described case.

There is a related system comprising a backup server that is shared by a plurality of nodes, and wherein the processing result of each node is stored in the shared backup server so that the result can be retrieved at any time from any other node. However, the system according to the invention differs from the system wherein the shared backup server is used in the following point:

In the related system, only the state of a single machine is restored. For example, in a common document data server system, only the state of a client terminal is restored. In an ASP (Active Server Pages) system, which is another example of the related system, only the state of a server is restored. On the other hand, in the present invention, the state of the whole system is restored including connection state of the image processing server.

For this purpose, information stored in the state storing server includes not only information that is necessary for generating an image, but also information that is not indispensable but can be useful for improving system performance. The former type of information is referred to as "indispensable information", and the latter type is referred to as "recommended information." In other words, the "indispensable information" is information explicitly specified by the user, and the "recommended information" is information generated by the system based on the "indispensable information." Therefore, if the recommended information is lost, it can be restored based on the indispensable information. In fact, some of the recommended information may become invalid with the passage of time, such as configuration of image processing server, but the image processing task can be resumed using "indispensable information".

The recommended information is used to restore the system efficiently by giving hints to the system; configuration of image processing server is a representative example of the recommended information.

The configuration of image processing server provides information on at least one node which previously worked as an image processing server, and is used at the time of dynamic assignment of image processing server. To re-select such node as an image processing server may significantly contribute to the system efficiency, since it is highly probable that the node already holds the required image source data and need not retrieve the image source data from the data server.

Each information in the task property may be classified into two types of information, the "indispensable information" and the "recommended information" as described above, but the classification is flexible to some extent. For example, if the user strongly demands use of a specific image processing server, configuration of image processing server may be contained in the indispensable information.

Among (1) to (16) listed above as task property, the indispensable information is (1) window layout, (2) image type (ray casting, MPR (Multi Planar Reconstruction), MIP (Maximum Intensity Projection)), (3) user defined caption, diagnosis result, (4) camera position, camera type, camera angle, magnifying scale power of camera, etc., (5) mask, region extraction information, (6) path information representing vessel course, etc., (7) additional information map (for example, Perfusion) provided by image analysis, (8) any other necessary information for generating a same image as an image when the task property storing condition is satisfied, (9) identifier of image source data being processed, (10) user name, and (11) processing date and time.

On the other hand, the recommended information is (12) OS (operating system) level information, version information, (13) information of identifier, processing capability, etc., of the node taking charge of the task, (14) additional information, (15) information indicating intermediate step of calculation, and (16) patient information.

In the above example, processing date and time is not indispensable for diagnosis in itself, but should be included in the indispensable information because it is a log of task explicitly performed by the user.

Information is transferred directly between the client terminal and the image processing server without the intervention of the state storing server. The state storing server is involved in the operation of the system only when state storing processing and state call up processing are performed, because the information transfer between the client terminal and the image processing server relates to image processing and does not relate to state storing.

The storing condition satisfaction monitoring section communicates some information with the client terminal and the image processing server for monitoring during execution of general image processing. When the storing condition is satisfied, the storing condition satisfaction monitoring section notifies the state storing server of information of the nodes (client terminal and image processing server) involved in processing. The notified state storing server collects information from the client terminal and the image processing server, and starts information storing processing. For example, even if connection with the client terminal is lost, if both the client terminal and the image processing server hold the indispensable information and the recommended information, the state can be retrieved from the image processing server and be stored. The state storing server in itself does not perform processing other than that which is relevant to state storing; except, if the storing condition satisfaction monitoring section is installed in the state storing server, communication with the state storing server and the client terminal is also done by the state storing server.

When the state is stored, state information is obtained not only from the client terminal, but also from the image processing server. That is, the indispensable information and the recommended information are made to exist in both the client terminal and the image processing server, so that even if connection with any one is lost, process can be continued. In practice, this can be realized with little cost since both the client terminal and the image processing server need to directly hold most of the indispensable information and the recommended information in order to perform image processing task itself. However, storing the recommended information is not the absolute requirement, and the recommended information may exist only in one node in some cases.

In the state storing server according to the present invention, a plurality of states can be stored. Accordingly, when the state is restored, user can select the most favorable state among them. To do this efficiently, each of the images of the display screens at the state storing time can be presented to the user.

Swap Out at Emergency Time:

When a plurality of client terminals are connected to the image processing system, the client terminals are provided with priority information, whereby the task state of the client terminal with low priority can be stored, so that the terminal node can be released and used as an image processing server to serve the client terminal with high priority.

1. A message is sent to the client terminal with low priority indicating that a task of high priority has been posted and thus the task state of the client terminal is stored. The user of the client terminal is also informed by message.

2. The display screen of the client terminal with low priority need not be changed.

3. Preferably, the task state of the client terminal with low priority that is automatically halted is automatically restored when the system load lessens.

In doing so, it becomes easy to allocate many resources to the important client terminal under circumstances where an emergency case arises, for example.

Delayed Release of Image Processing Server:

It is advisable to set a release enable flag of the image processing server instead of releasing the image processing server immediately after the task property storing condition is satisfied, and to delay releasing the image processing server until the resources of the memory, etc., of the image processing server becomes insufficient. If the node is re-selected as an image processing server for the same task, the task can be resumed rapidly, because, for example, there is a chance that the image source data is still remaining in the node.

Handling of Medical Image Source Data:

In medical image processing, particularly if the medical image source data is volume data, data size of a task property is generally much smaller than the medical image source data. In this case, the medical image source data is not contained in the stored information, and the medical image source data is acquired again from the data server when processing is resumed, whereby the stored information can be stored rapidly and information stored in the state storing server can be prevented from becoming enormous.

Thus, according to the invention, it is made possible to resume a volume data processing task by a client terminal which is different from the client terminal that has interrupted the task.

As described above, according to the volume data processing system of the invention, the task property is stored in the state storing server, whereby any client terminal can acquire the task property from the state storing server, and the task state can be recovered.

Further, dynamic reassignment of the image processing servers is conducted as required while the information of the previous image processing server is used, whereby the task state can be recovered efficiently.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An image processing system using volume data comprising at least two nodes connected via a network which includes a client terminal, a state storing server, an image processing server and a data server, said image processing system being operative to:
   use said at least two nodes as the image processing server to perform an image processing task for the client terminal, the image processing task comprising at least one of: volume rendering and region segmentation processing;
   monitor satisfaction of a rendering parameter storing condition for storing a rendering parameter of the client terminal, said rendering parameter comprising information used to restore a processed image resulting from volume data being processed in the image processing task to generate said processed image;
   collect said rendering parameter of a task state of the client terminal and store the collected rendering parameter in the state storing server when said rendering parameter storing condition is satisfied;
   release at least one of said at least two nodes which were being used as the image processing server;
   read said rendering parameter which corresponds to the client terminal from the state storing server;
   restore said task state of the client terminal by using the read rendering parameter in a proxy node which is at least any one of said at least two nodes and a node which is newly added to said image processing system,
   wherein said proxy node is operative to select at least one image processing server from said node for restoring the task state of the client terminal, and
   wherein said proxy node is operative to inquire of said image processing server whether the image processing server holds volume data which can be used for restoring the task state of the client terminal so as to select said at least one image processing server;
   after said restore, send said restored task state to a combination of said at least two nodes as the image processing server, the combination being different from said at least one of said at least two nodes which was previously being used as the image processing server; and
   utilizing said rendering parameter for restoring said processed image on said proxy node to resume processing on said processed image to be performed on and after the time when said rendering parameter storing condition is satisfied.

2. The image processing system as claimed in claim 1, wherein said rendering parameter includes at least one of a window layout, an image type, an user defined caption, a diagnosis result, a camera position, a camera type, a camera angle, a magnifying scale power of a camera, an operating system level information, an operating system version information, a mask and region extraction information, a path information representing a vessel course and the like, an additional information map provided by an image analysis, a necessary information for restoring said processed image, information on the node which processed the task such as an identifier and processing capability of the node, an identifier of volume data being processed, a user name, a processing date and time, an additional information, an information indicating intermediate step of calculation, and a patient information.

3. The image processing system as claimed in claim 1 further being operative to monitor a calculation resource amount which includes at least any one of a current load state, a performance record, a status, a performance specification and a distance on the network of said at least one node respectively.

4. The image processing system as claimed in claim 1, wherein said image processing server is capable of assigning the processing of said image processing server to at least one other image processing server.

5. The image processing system as claimed in claim 1, wherein at least any one of volume rendering processing, region extraction processing, image filtering processing, noise removal processing, image fusion processing, perfusion calculation processing, back projection processing, projection processing and geometry transform processing is performed.

6. The image processing system as claimed in claim 1, wherein said rendering parameter storing condition includes at least any one of non-existence of command for a certain amount of time, every expiration of a certain amount of time, when the client terminal enters a specific state, when the state storing server enters a specific state, when an explicit command is received from the client terminal, when the client terminal is paused, and when the user exits task involved in the volume data.

7. The image processing system as claimed in claim 1, wherein the client terminal comprises a plurality of client terminals, and said rendering parameter storing condition is further satisfied for the client terminal with low priority when the client terminal with high priority exists in the system and a load on the system is high.

8. The image processing system as claimed in claim 1, wherein at least any one of a termination of the client terminal and a release of the image processing server is performed when said rendering parameter storing condition is satisfied.

9. The image processing system as claimed in claim 1, wherein said image processing server acquires said volume data from said data server when the processing is resumed.

10. A method for performing image processing using volume data having at least two nodes connected via a network, said method comprising:
   using said at least two nodes as an image processing server to perform an image processing task for the client terminal, the image processing task comprising at least one of: volume rendering and region segmentation processing;
   monitoring satisfaction of a rendering parameter storing condition for storing a rendering parameter of a client terminal, said rendering parameter comprising information used to restore a processed image resulting from volume data being processed in the image processing task to generate said processed image;
   collecting said rendering parameter of a task state of the client terminal and storing the collected rendering parameter in a state storing server when said rendering parameter storing condition is satisfied;
   releasing at least one of said at least two nodes which were being used as the image processing server;
   reading said rendering parameter which corresponds to the client terminal from the state storing server;
   restoring said task state of the client terminal by using the read rendering parameter in a proxy node which is at least any one of said at least two nodes and a node which is newly added;
   after said restoring, sending said restored task state to a combination of said at least two nodes as the image processing server, the combination being different from said at least one of said at least two nodes which was previously being used as the image processing server; and utilizing said rendering parameter for restoring said processed image on said proxy node for resuming processing on said processed image to be performed on and after the time when said rendering parameter storing condition is satisfied.

11. An image processing system using volume data comprising at least two nodes connected via a network which includes a client terminal, a state storing server, an image processing server and a data server, said image processing system being operative to:

use said at least two nodes as the image processing server to perform an image processing task for the client terminal, the image processing task comprising at least one of: volume rendering and region segmentation processing;

monitor satisfaction of a rendering parameter storing condition for storing a rendering parameter of the client terminal, said rendering parameter comprising information used to restore a processed image resulting from volume data image being processed in the image processing task to generate said processed image;

collect said rendering parameter of a task state of the client terminal and store the collected rendering parameter in the state storing server when said rendering parameter storing condition is satisfied;

read said rendering parameter which corresponds to the client terminal from the state storing server;

restore said task state of the client terminal by using the read rendering parameter in a proxy node which is at least any one of said at least two nodes and a node which is newly added to said image processing system; and utilizing said rendering parameter for restoring said processed image on said proxy node to resume processing on said processed image to be performed on and after the time when said rendering parameter storing condition is satisfied, wherein information is transferred directly between the client terminal and the image processing server with the intervention of the state storing server.

12. The image processing system as claimed in claim 11, wherein said image processing server acquires said volume data from said data server when the processing is resumed.

* * * * *